United States Patent [19]

Debortoli et al.

[11] 4,009,340
[45] Feb. 22, 1977

[54] LOADING COIL ASSEMBLIES FOR COMMUNICATIONS CABLES

[75] Inventors: George Debortoli; Peter McGivery Chase, both of Ottawa, Canada

[73] Assignee: Northern Electric Company Limited, Montreal, Canada

[22] Filed: Sept. 22, 1975

[21] Appl. No.: 615,549

[52] U.S. Cl. ............................ 178/46; 178/45; 336/65; 336/90; 336/185; 174/70 R
[51] Int. Cl.² ...................................... H01F 17/08
[58] Field of Search ............ 178/45, 46; 336/65 R, 336/90 R, 185; 174/70 R; 333/1

[56] References Cited

UNITED STATES PATENTS

| 834,352 | 10/1906 | Albright | 178/46 |
|---|---|---|---|
| 1,103,130 | 7/1914 | Horner et al. | 178/45 |
| 1,668,710 | 5/1928 | Doring et al. | 178/46 |
| 1,768,240 | 6/1930 | Falk | 178/46 |
| 3,134,854 | 5/1964 | Martin, Jr. et al. | 178/46 |
| 3,838,213 | 9/1974 | Georgopulos et al. | 178/46 |
| 3,845,435 | 10/1974 | Georgopulos | 336/65 |
| 3,865,980 | 2/1975 | Moser et al. | 333/1 |

*Primary Examiner*—Saxfield Chatmon, Jr.
*Attorney, Agent, or Firm*—Sidney T. Jelly

[57] ABSTRACT

A rectangular loading coil case has front, back, side and end panels, with cable entry and exit provided in one end panel, and with a support structure attached to, for example, the front panel and comprising rods extending across the case with a series of beams extending in opposed pairs and supported on the rods by spacer members positioned on the rods. Assembled magazines of loading coils are supported on the beams, each magazine supported at one end by one of a pair of beams and supported at the other end by the other of the pair of beams. A plurality of magazines are carried by each pair of beams, to form a layer. The number of layers can vary.

12 Claims, 13 Drawing Figures

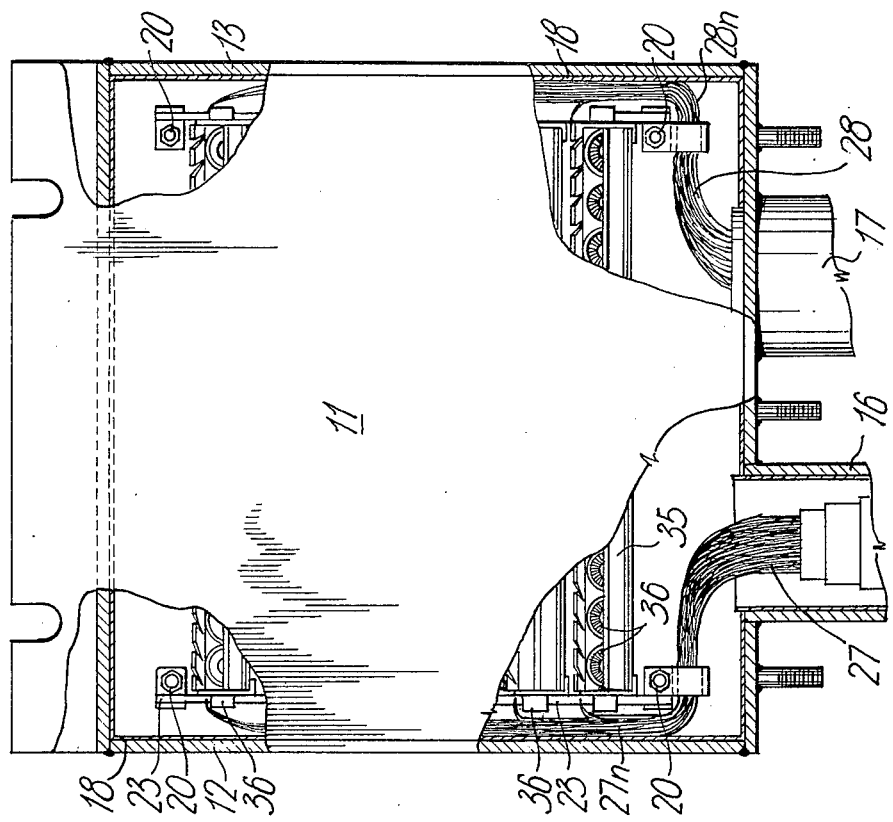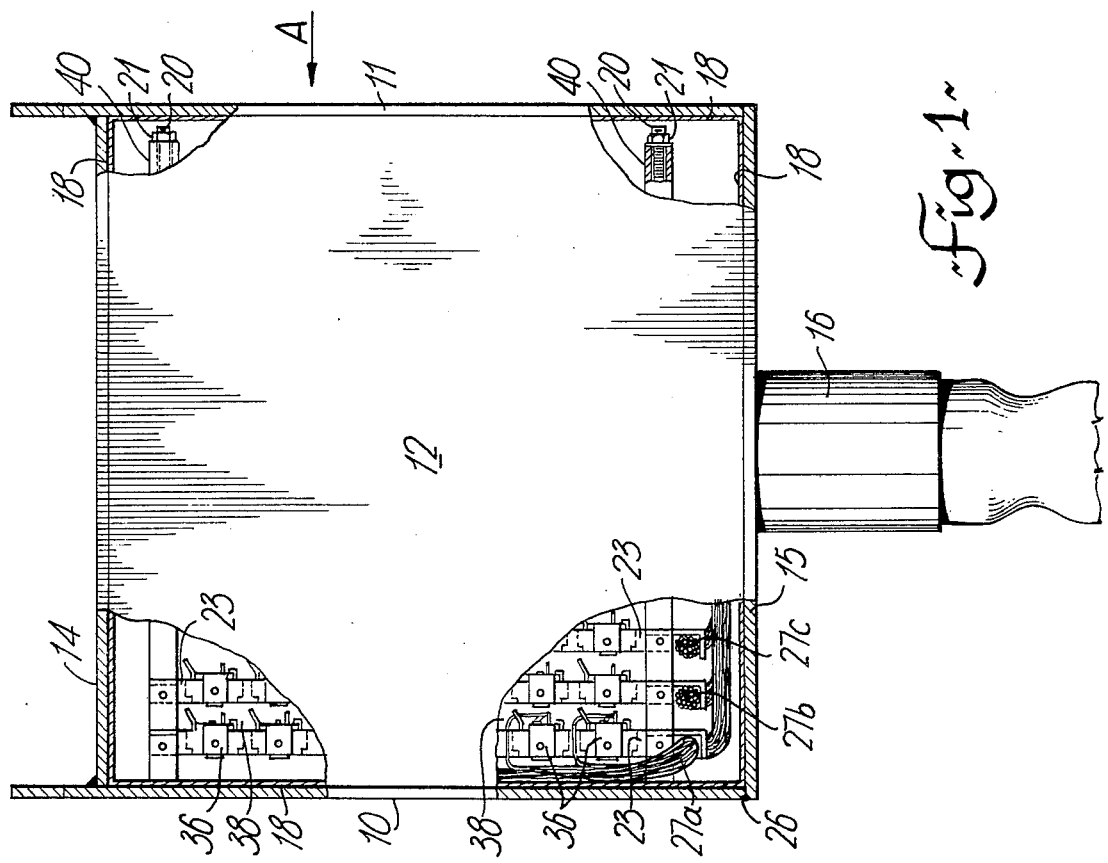

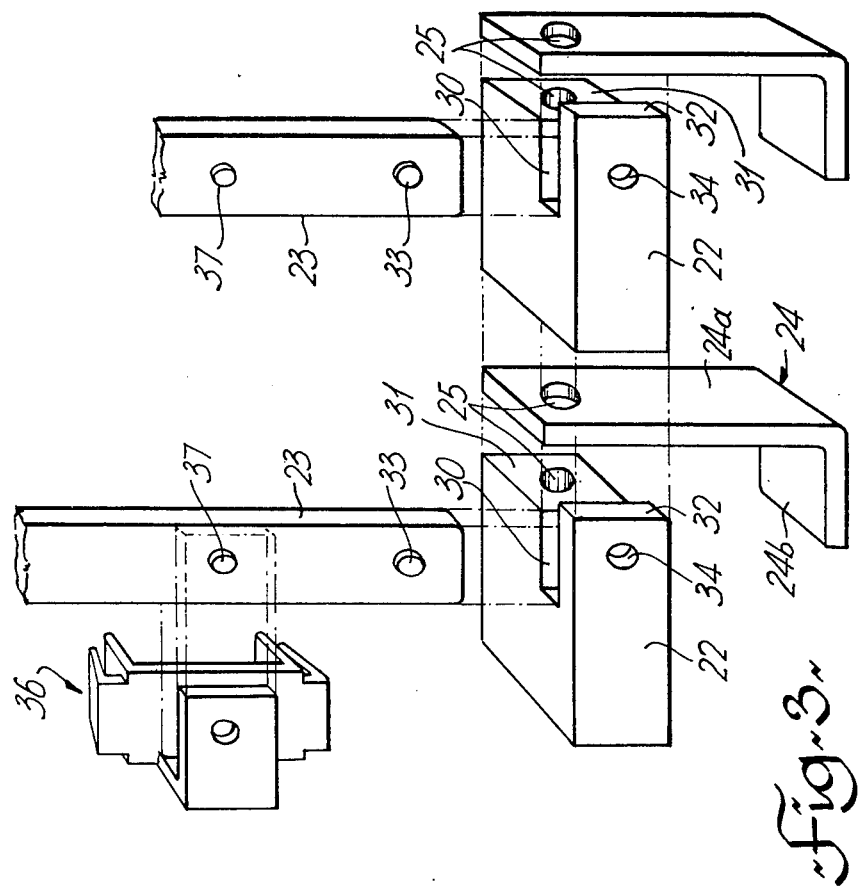
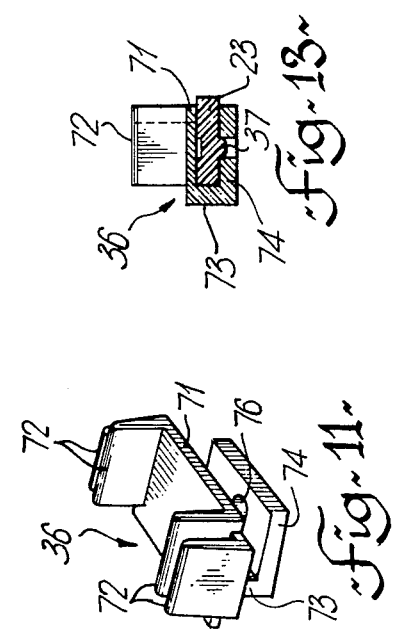
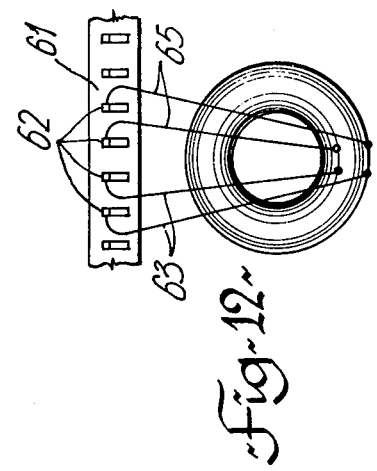

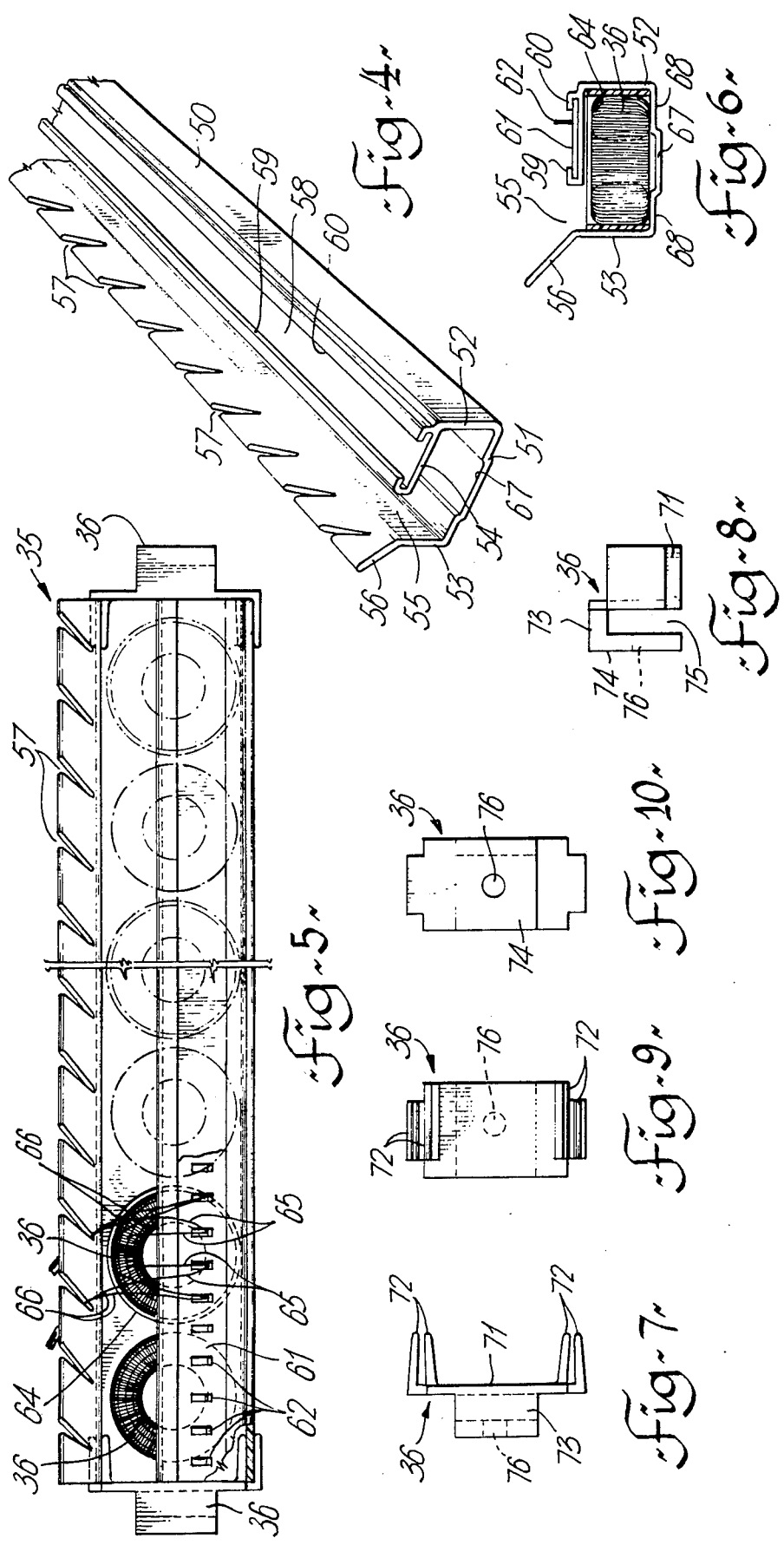

LOADING COIL ASSEMBLIES FOR COMMUNICATIONS CABLES

This invention relates to loading coil assemblies for communications cables, particularly but not exclusively for telephone cables.

Loading coils, assembled into casings or housings, are positioned at predetermined positions along a cable to maintain desired transmission characteristics. Thus, for example, coils may be stacked on dowels, or positioned in shaped recesses in discs or plates, with the discs or plates mounted in superposed position.

With coils stacked on dowels, or similar devices, adjacent coils must be positioned so that cross-talk is kept below a predetermined level. For example the beginnings and ends of the windings of adjacent coils are displaced radially relative to one another. This positioning is provided by hand on assembly and may require adjustment after final assembly if magnetic coupling is excessive. Adjacent coils are also separated by a spacer, for example an insulated metal washer.

With coils positioned in recesses in discs or trays, physical separation can be good, but such an assembly is large with much wasted volume.

Conventionally, loading coil cases are cylindrical, with the loading coils arranged around a central opening extending axially the full length of the casing. This is wasteful of space as the full diameter of the central opening is only used at the end at which enters the stub cable. Also, to avoid provision of too many sizes of cases, the central opening is made large enough to accept a variety of cable sizes. Further, cylindrical cases are normally applicable to aerial mounting and therefore are normally designed to carry a limited number of coils, for example 25 to 750 coils. Cases containing higher numbers of coils, for example 750 to 3600 coils, are normally limited to underground mounting.

The present invention provides for a rectangular case for loading coils, with provision for stacking preassembled magazines and loading coils in a compact, efficient manner, with minimum waste space and good electromagnetic separation between adjacent coils. A very large number of coils can be provided in a compact, efficient arrangement. In a particular arrangement the case is square in cross-section.

The invention will be readily understood by the following description of an embodiment, by way of example, in conjunction with the accompanying drawings, in which:

FIG. 1 is a side view of a casing, with parts sectioned to show assembly details;

FIG. 2 is a view of the casing of FIG. 1, also with parts sectioned to show details; in direction of arrow A;

FIG. 3 illustrates to an enlarged scale, in exploded form, details of the support structure for magazines;

FIG. 4 is a perspective view of an extruded or molded section for a magazine;

FIG. 5 is a plan view of a magazine with coils in position;

FIG. 6 is an end view of the magazine of FIG. 5, with the end cap removed;

FIGS. 7, 8, 9, 10 and 11 are respectively plan view, side view, end view, front view and a perspective view of an end cap for the magazine of FIGS. 4, 5 and 6;

FIG. 12 is an extended plan view illustrating the attachment of the wires from the coils to the terminal strip;

FIG. 13 is a cross-section of an end cap and support rail showing positioning means.

As illustrated in FIGS. 1 and 2, a casing comprises front and back panels 10 and 11, side panels 12 and 13, a top panel 14 and a base panel 15. A stub cable entry and a stub cable exit are formed in the base panel 15 at 16 and 17 the particular use as entry or exit being as desired. The case is conveniently of metal, the panels welded together as described later. The case is lined with an insulating layer 18.

A support structure is built-up inside the case to carry the loaded or preassembled magazines. Four long rods 20 are attached, as by welding to the front panel 10. The rods are threaded at their outer ends for nuts 21, and extend almost from front to back of the case. Assembled onto the rods 20 are a series of members which build up a structure, the members seen in more detail in FIG. 3.

There are three members — a spacer 22, a transverse beam 23 which extends from top to bottom of the case and is supported by a spacer 22 at each end, and a conductor support bracket 24. The spacers 22 and support brackets 24 each are positioned on the rods 20 by holes 25 which extend through the members.

A case is assembled as follows. The base 15 and front 10 are welded together, at 26 and attached to the stub cables via inlet and outlet 16 and 17. The conductors 27 and 28 of the cables are split up into bundles 27a, 27b–27n and 28a, 28b–28n, a bundle for each layer of magazine, with each bundle being further sub-divided into smaller bundles, one for each magazine. One cable will be fed to one end of the casing, e.g., the front, and the other cable to the other end, e.g., the back.

A first spacer 22 is placed on each rod 20. A spacer 22 is a generally rectangular block with the holes 25 slightly offset from a center line and a slot 30 in what is termed the top surface 31 for convenience. The end of the spacer defining one wall of the slot 30, on the side remote from the hole 25, extends above the top surface 31 a short distance at 32. A transverse beam 23 is then positioned in the slots 30, one beam extending between top and bottom rods on one side of the case and another beam extending between top and bottom rods at the other side of the case. The beams 23 are located and held in position by a protrusion 33 at each end which snaps into a hole 34 in each spacer 22. A support bracket 24 is then positioned on each rod 20. The brackets 24 are L-shaped with the long leg 24a in contact with the top surface 31 of the spacer 22. The width of the brackets is such that they overlie the beams 23 and assist in holding them in position. The short legs 24b of the brackets act as supports for the bundles of conductors 27a–n and 28a–n. There are thus two spaced apart parallel beams 23 and onto these beams are positioned magazines 35 preassembled with coils 36. The magazines 35 will be described in more detail with respect to FIG. 4 to 13, and are positioned on the beams by means of end caps 36 which clip over the beams 23. The end caps have holes therein which engage with protrusions 37 on the beams 23. The subdivided bundle of wires is positioned in the space 38 between two adjacent magazines and the pairs from the incoming cable connector to two terminals and similarly the pairs from the outgoing cable connected to two further terminals for each coil. Thus, progressing from one side of the case to the other, one set of conductors gradually reduces in number and the other set increases.

Once one layer of magazines has been wired, a further spacer 22 is positioned on each rod, two further beams 23 placed in position and a further support bracket 24 positioned on each rod. A further layer of magazines is positioned on the second set of beams, and the cable conductors connected to the coils.

The assembly continues until the required number of magazines has been assembled. This may completely fill the case or may only partially fill it. Finally tubular spacers 40, as necessary, are placed on the rods 20 and nuts 21 applied and tightened.

After the assembly of the magazines in the case, the side panels 12 and 13 are welded in place, and then either the top panel 14 or back panel 11. At this stage the case is filled with expanding plastic material to fill all the voids between magazines, and between coils in the magazines. Finally the last panel, either back panel 11 or top panel 14 is welded into place. The front and back panels 10 and 11 are shown with extended portions 41 having slots 42 therein for attachment of the case to a support structure.

The capacity of a case can be varied by varying the case length, that is by length of the front and back, 10 and 11, and sides 12 and 13, from the base 15 to the top 14. The lengths of the beams 23 would be varied accordingly. Thus it is possible to provide a range of sizes of cases by having a series of different lengths of fronts, backs and sides, and the corresponding beams. This would avoid wasted spaced in a case.

FIGS. 4 to 12 illustrate a magazine and a cap, and the assembly of coils in a magazine.

As seen in FIG. 4, a main body 50 of a magazine 35 is in the form of an extrusion having a modified channel-shaped cross-section. Thus there is a base web 51, two parallel side webs 52 and 53 and an inwardly extending top web 54 extending from the top edge of side web 52 towards side web 53. Top web 54 extends only part way across the body 50 to leave an access slot 55. At the top edge of the side web 53 extends an outwardly inclined web 56. Inclined slots 57 are formed in web 56 which acts as a fanning strip for the cable pairs.

The top surface of top web 54 is shaped to provide a shallow channel 58 with inturned edges 59 and 60. Terminal strips 61 (FIG. 5) slide into the shallow channel 58 from the end of the body 50. Conveniently each terminal strip has four terminals 62 and serves for one coil. If desired longer terminal strips could be used with more than four terminals. Also the terminals could be mounted by some other arrangements, for example ultrasonically inserted directly to the top surface of the web.

The arrangement of coils and terminal strips is seen in FIGS. 5 and 6, coils 36 being shown in the main body 50, together with associated terminal strips 61. Each alternate coil is surrounded by a plastic sleeve 64. Attaching of the wires 65 from the coils 36 to the terminals 62 to a large extend prepositions the coils so that the beginnings and ends of the windings, which as seen in FIG. 12 are at the positions at which the wires 65 extend from the coil, are not adjacent to each other in adjacent coils. This positioning prevents excessive magnetic coupling between adjacent coils. Generally the coils are positioned as illustrated in FIG. 5. The conductors from the cable are indicated at 65.

The coils are a fairly close fit in the main body 50 and are slid in from one end. To reduce friction between coils and the base web 51 this is shaped to have a recessed centre portion 67 and raised side portions 68, although this is not essential. This is seen quite clearly in FIG. 6. The recessed portion also allows for a rear entrance slot to the coils when potting the coils with a polyurethane type filler compound.

The coils can be fed in from both ends of the body 50 or only from end, as desired. If the magazine is of flexible material, the coils can also be inserted via the longitudinal opening. End caps 36 are fitted on each end of the body to retain the coils in position and to provide attachment means for the magazine. In FIG. 5, an end cap 36 is shown on each end.

FIGS. 7, 8, 9, 10 and 11 illustrate an end cap in more detail. Basically an end cap 36 comprises a channel shaped member having a base web 71 and a pair of closely spaced webs or legs 72 on each side. The webs or legs 72 of a pair are spaced apart so as to be a push fit on one of the side webs 52 and 53 of the body 50. The pairs of webs or legs are spaced so that each pair cooperate with a related side web 52 or 53. Extending from one edge of the base web 71 — referred to as the top edge for convenience, is a short web 73. Web 73 extends in the opposite direction to the webs or legs 72 and at its end is a further web 74 extending parallel to and spaced a short distance from the base web 71. There is thus provided a slot 75 which provides a means for attaching magazines to the support beams 23 (FIGS. 1, 2 and 3). A hole 76 is formed in the web 74 for cooperation with the protrusions 37 on the beams 23. This is illustrated in FIG. 13, which is a cross-section through an end cap and beam.

After assembly of the coils into a magazine, attaching of end caps and soldering, or otherwise connecting wires 65 to the terminals 62, there is provided a compact assembly for attachment to the beams 23 in a casing. The connection of the wires 65 to the terminals is done at the magazine assembly stage. With the coils positioned side-by-side, with their axis perpendicular to the assembly plane, there is only line contact between adjacent coils, and even here there is slight separation by the plastic sleeve 64. Thus cross-talk is reduced to a minimum. Also, as described above, the connecting of wires 65 to the terminals 62 on the terminals strips 61 — with the offset positioning of the terminal strips relative to the coil axes, tends to ensure that the coil winding starts and ends of adjacent coils are spaced apart from each other. The connection of wires 65 to the terminals 62 is clearly illustrated in FIG. 12.

It has been found convenient to provide for two different coil sizes, one for suburban use and a larger coil for rural areas where conditions of service can be more severe. For the larger coils, magazines having a larger cross-section are used.

What is claimed is:

1. A loading coil case assembly comprising:
   a case including base, front, back and side panels, the case of rectangular cross-section in a plane parallel to the base panel;
   a cable end entry and a cable end exit in one of said panels, and a cable end in each of said entry and exit;
   a support structure in said case for supporting a plurality of assembled loading coil magazines, conductors from said cable ends connected to loading coils in said magazines;
   said support structure comprising a plurality of rods each attached at one end to the same one of said panels and extending normal thereto across said case, said rods arranged in a rectangular array, and spaced apart in one direction a distance substantially equal to the length of a magazine, a plurality of support members mounted sequentially on each rod, and a plurality of beams supported at each end on a support member and extending across said case normal to the axis of said rods and normal to said one direction to provide two spaced parallel series of beams each series in a plane parallel to the plane of the two related rods carrying the support members supporting the related beams, the beams forming opposed pairs;

a plurality of elongated magazines supported at each end by one of said opposed pair of beams, each magazine having a plurality of loading coils positioned side by side therein, the axes of said loading coils parallel to each other and extending normal to the longitudinal axis of the magazine, to provide a plurality of layers of loading coil magazines;

expanded synthetic resin electrically insulating material filling spaces in said case between said magazine.

2. An assembly as claimed in claim 1, said support structure including a plurality of conductor support brackets on each rod, a bracket interposed between each pair of support members, said support brackets each of L-shaped configuration with one leg positioned between adjacent support members and another leg extending in a plane parallel to the longitudinal axis of the related rod on that side of said rod remote from said beams.

3. An assembly as claimed in claim 1, said rods extending from front to back of said case and said cable entry and exit in said base panel.

4. An assembly as claimed in claim 2, the conductors from a cable end subdivided into a first series of bundles of wires, each bundle supported on a separate conductor support bracket and containing conductors for connection to the coils of a layer of loading coil magazines, each bundle further subdivided into smaller bundles, a smaller bundle positioned in a space between two adjacent magazines, the conductors from said cable end in said cable inlet progressively connected to said coils, and the conductors from said cable end in said cable exit also progressively connected to said coils, the smaller bundles from the cable end in said cable inlet passing into said spaces at an opposite end to said smaller bundles from said cable end in said cable exit.

5. An assembly as claimed in claim 1, including interengaging formations on said support members and on each end of said beams.

6. An assembly as claimed in claim 1, including interengaging formations at the ends of said magazines and on said beams, said formations locating and retaining said magazines in predetermined positions.

7. An assembly as claimed in claim 1, each of said loading coil magazines comprising:

a body member of a length of preformed electrically insulated material having a channel shaped cross section including a base web, two spaced apart side webs extending from said base web, and a top web on an upper part of a first one of said side webs, said top web extending inwardly over and spaced from said base web;

at least one terminal strip on said top web and including terminals thereon;

a plurality of loading coils positioned side by side in said body member, the axes of said coils parallel and extending normal to said base web, each end of the winding of the coil attached to a related terminal;

an end cap on each end of said body member, each end cap including an outwardly extending formation for engagement with a support member.

8. A loading coil assembly as claimed in claim 7, including a further web at the top of a second one of said side webs, said further web extending in a direction away from said base web, and slots in said further web, said slots adapted for the acceptance of conductors for attachment to said terminals.

9. A loading coil assembly as claimed in claim 7, including an insulating sleeve around at least each alternate coil.

10. A loading coil assembly as claimed in claim 7, said top web including inturned edges to define a shallow channel cross-section, said terminal strip a sliding fit in said channel.

11. A loading coil assembly as claimed in claim 7, said terminal strip extending the full length of said body member.

12. A loading coil assembly as claimed in claim 7, including a plurality of terminal strips, a strip for each coil.

* * * * *